United States Patent [19]

Tam et al.

[11] Patent Number: 5,372,389
[45] Date of Patent: Dec. 13, 1994

[54] NOZZLE SWIVEL JOINT

[75] Inventors: Jimmy W. S. Tam, Plymouth; David J. Thompson, Anoka, both of Minn.

[73] Assignee: Graco Inc., Golden Valley, Minn.

[21] Appl. No.: 80,760

[22] Filed: Jun. 22, 1993

[51] Int. Cl.$^5$ .............................. F16L 27/00
[52] U.S. Cl. ............................ 285/94; 285/123; 285/168; 285/190; 285/281
[58] Field of Search ............ 285/190, 123, 272, 281, 285/168, 94

[56] References Cited

U.S. PATENT DOCUMENTS

| | | | |
|---|---|---|---|
| 2,011,446 | 8/1935 | Judell . | |
| 2,080,970 | 6/1937 | Walter | 285/190 X |
| 2,400,658 | 5/1946 | Shepherd | 285/190 |
| 3,007,485 | 11/1961 | Barker | 285/190 X |
| 3,125,360 | 3/1964 | Ulrich | 285/190 X |
| 3,166,252 | 1/1965 | O'Brien et al. . | |
| 3,210,099 | 10/1965 | Franck | 285/190 |
| 3,384,394 | 5/1968 | O'Connor | 285/190 |
| 3,402,253 | 9/1968 | McCracken | 285/190 X |
| 3,685,745 | 8/1972 | Peschcke-Koedt . | |
| 3,893,630 | 7/1975 | Bochmann et al. . | |
| 3,967,836 | 7/1976 | Legris | 285/190 |
| 4,437,690 | 3/1984 | Drath . | |
| 4,615,547 | 10/1986 | Sutcliffe et al. . | |
| 4,823,835 | 4/1989 | Chu | 285/168 X |
| 4,938,255 | 7/1990 | Lanfri et al. . | |
| 5,014,732 | 5/1991 | Nitzberg | 285/272 X |
| 5,052,432 | 10/1991 | Vonalt et al. . | |
| 5,052,724 | 10/1991 | Konrad et al. . | |

FOREIGN PATENT DOCUMENTS

| | | | |
|---|---|---|---|
| 0510840 | 12/1920 | France | 285/190 |
| 0014095 | of 1912 | United Kingdom | 285/123 |
| 0843338 | 8/1960 | United Kingdom | 285/190 |
| 2159594 | 12/1985 | United Kingdom | 285/190 |

Primary Examiner—Randolph A. Reese
Assistant Examiner—Heather Chun Shackelford
Attorney, Agent, or Firm—Palmatier, Sjoquist & Helget

[57] ABSTRACT

The nozzle swivel joint includes two couplings which are joined together at mutually flat interface surfaces. Each coupling has an axial flow passage, and the two couplings are held together in mutually rotatable position by a manifold with a threaded end; the manifold having inlet and outlet ports respectively aligned to the flow passages in the couplings. The manifold is sealably affixed to one of the couplings, with a gasket forming a seal about the threadable manifold. An O-ring is compressed between the respective flat interface surfaces to provide a limited friction seal for restricting relative rotation between the couplings, while at the same time permitting rotation to occur with a limited amount of force.

19 Claims, 2 Drawing Sheets

NOZZLE SWIVEL JOINT

BACKGROUND OF THE INVENTION

The present invention relates to spray nozzles; more particularly, the invention relates to a nozzle swivel joint capable of conveying pressurized liquids and which is rotatable a full 180° about its axis of swivel.

The invention finds particular utility in systems requiring the delivery of pressurized liquids, such as paint spraying systems, wherein a coating material is delivered under pressure through a spray nozzle, and wherein it is important to selectively position the spray nozzle relative to the workpiece. In such a system, a plurality of paint spray nozzles are typically positioned adjacent a movable conveyor line, and workpieces of various sizes and shapes are placed on the conveyor line for movement past the spraying station. The spray nozzles are controlled by a timing mechanism and/or position-responsive sensors so as to emit a spray pattern when a workpiece passes in front of each particular spray nozzle. At the time of initial setup, it is important that each spray nozzle associated with a spraying station be selectively positioned for optimal coating of the workpieces. Once the spray nozzles have been optimally positioned, it is important that the nozzles remain in the preselected position for so long as the workpieces are moved past the spraying station. Subsequently, other and different batches of workpieces may be placed on a conveyor line and the respective spray nozzles may be repositioned to optimally coat the new workpieces. Therefore, it is important that the spray nozzle have the capability of variable positioning, while at the same time have the capability of remaining in a fixed position after adjustment.

The present invention accomplishes these advantageous purposes, to provide an adjustable nozzle swivel joint which is sealably positionable over a 180° range about a swivel axis.

SUMMARY OF THE INVENTION

The nozzle swivel joint includes two couplings which are joined together at mutually flat interface surfaces. Each coupling has an axial flow passage, and the two couplings are held together in mutually rotatable position by a manifold with a threaded end; the manifold having inlet and outlet ports respectively aligned to the flow passages in the couplings. The manifold is sealably affixed to one of the couplings, with a gasket forming a seal about the threadable manifold. An O-ring is compressed between the respective flat interface surfaces to provide a limited friction seal for restricting relative rotation between the couplings, while at the same time permitting rotation to occur with a limited amount of force.

It is a principal object of the present invention to provide a nozzle swivel joint having liquid sealing capabilities while being rotationally positionable about a swivel axis.

It is another object of the present invention to provide a nozzle swivel joint capable of 180° rotation about a swivel axis.

It is a further object of the present invention to provide a nozzle swivel joint which is rotatably movable about a swivel axis by a predetermined and limited amount of force.

It is another object of the invention to provide a reliable nozzle swivel joint which may be readily and easily assembled.

It is another object of the invention to provide a nozzle swivel joint in which the sealing characteristics and the rotational resistance of the joint is substantially independent of the extent the joint is tightened during assembly.

The foregoing and other objects will become apparent from the following specification and claims, and with reference to the appended drawings.

DESCRIPTION OF THE PREFERRED EMBODIMENT

Figure 1:
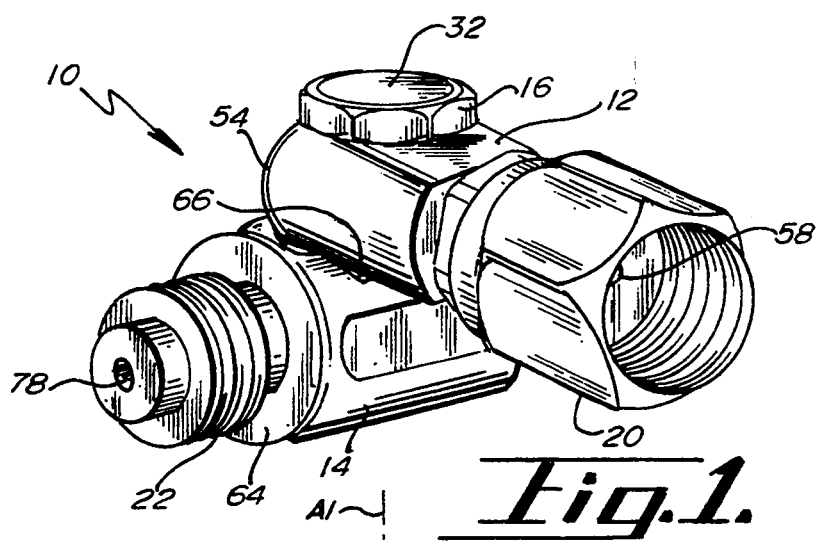
FIG. 1 shows an isometric view of the invention in one swivel position.
Figure 2:
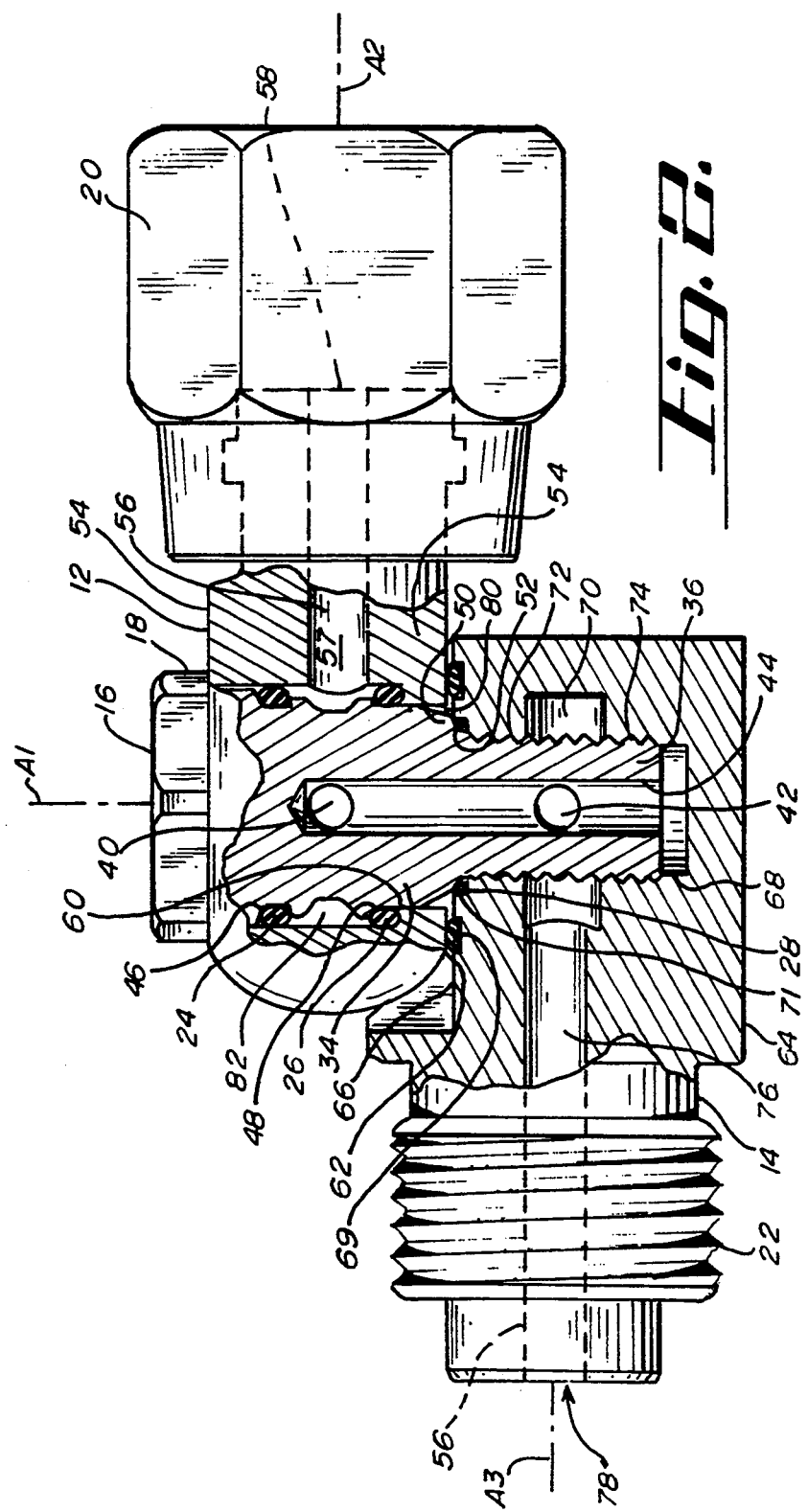
FIG. 2 shows a partial cross-section view of the invention in a second swivel position.

Referring to FIG. 1, a preferred embodiment of the nozzle swivel joint 10 is shown in an assembled mode with the nozzle swivel joint 10 at an angle of approximately 90°. The three principal structural elements of the nozzle swivel joint 10 are a first coupling 12, a second coupling 14 and an elongate manifold 16. In the preferred embodiment the first coupling 12 is connected to a liquid supply source or line and is designated a supply coupling. Similarly, the second coupling 14 is connected to a spray nozzle and is designated a nozzle coupling. The embodiment shown has a female threaded connector 20 attached to the supply coupling 12 and a male threaded connector 22 attached to the nozzle coupling 14. As best shown in FIG. 2, the elongate manifold 16 extends through the supply coupling 12 to connect with the nozzle coupling 14.

Shown in FIG. 2, positioned between the elongate manifold 16 and the supply coupling 12, are a first sealing O-ring 24 and a second sealing O-ring 26 each made of an elastomeric material such as Teflon. Positioned between the elongate manifold 16 and the nozzle coupling 14 is a gasket 28. The gasket 28 may be made out of nylon or other resilient materials. Positioned between the supply coupling 12 and the nozzle coupling 14 is a frictional O-ring 30. The frictional O-ring is also of an elastomeric material such as rubber.

Figure 3:
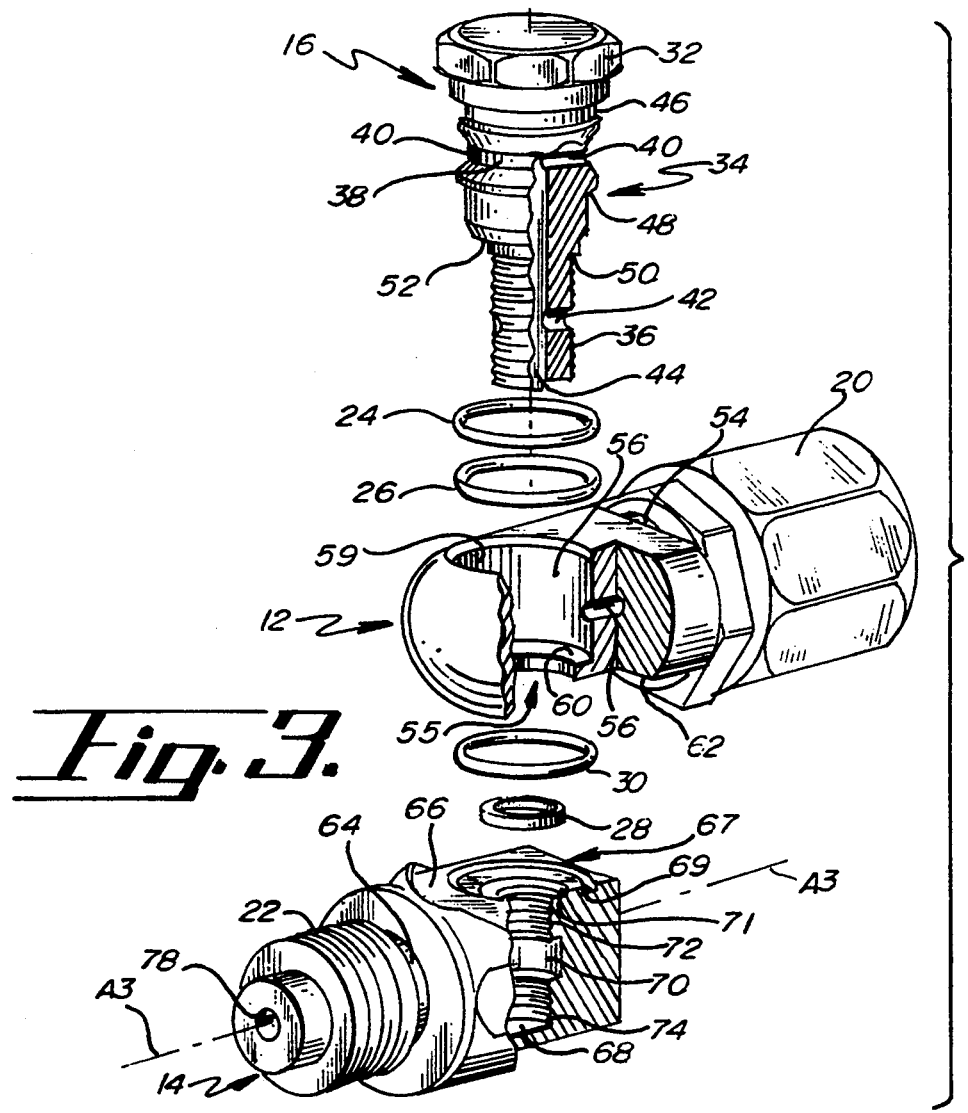
FIG. 3 shows an exploded view of the invention with portions cut away.

Details of the elongate manifold 16 are best shown in FIGS. 2 and 3. The elongate manifold 16 is generally bolt-shaped, having a head 32, a midsection 34 and a threaded end 36. A circumferential groove 38 is located at the midsection 34. An inlet port 40 extends diametrically through the midsection 34 at the circumferential groove 38. An outlet port 42 extends diametrically through the elongate manifold 16 at the threaded end 36. The elongate manifold 16 has an axis A1 extending longitudinally and has a connecting passageway 44 extending along the axis A1 from the threaded end 36 up through to the midsection 34 connecting the inlet port 40 with the outlet port 42. Positioned between the midsection 34 and the threaded end 36 is a collar 50 with a collar gasket seat 52.

Still referring to FIGS. 2 and 3, the supply coupling 12 is comprised of a body 54 which has a bore opening 55 and a bore 56 extending through the body 54. An axis A2 runs lengthwise and an axial flow passage 57 extends perpendicularly from the bore 56 to an inlet opening 58.

Shown best in FIG. 3, the bore 56 has an inside surface 59 and an O-ring seat 60. Surrounding the bore opening 55 is a flat downward interface surface 62.

The nozzle coupling 14 is comprised of a body 64 with an axis A3 and a flat upward interface surface 66. The upward interface surface 66 has a bore opening 67 and a bore 68 that extends downward from the upward interface surface 66 into an interior chamber 70. An additional gasket seat 71 surrounds the bore at the upward interface surface 66. The bore 68 has an upper threaded portion 72 and a lower threaded portion 74 above and below the interior chamber 70. Extending from the interior chamber 70 through the body 64 is an axial flow passage 76 exiting the nozzle coupling 14 at an outlet opening 78. The flat upward interface surface 66 has a circular groove 69 concentric with the bore 68. In the embodiment shown the cross-section of the groove 69 is rectangular, however, other shapes would also be effective. The frictional O-ring 30 seats in the circular groove 69.

The cooperation of the elements of the assembled nozzle swivel joint 10 is best illustrated in FIG. 2. The elongate manifold 16 secures the supply coupling 12 to the nozzle coupling 14 with the interface surfaces 62, 66 confronting each other.

The sealing engagement of the manifold 16 to the supply coupling 12 is provided by the sealing O-rings 24, 26. The first sealing O-ring 24 is seated in the first O-ring seat 46 and engages the inner surface 59 of the supply coupling 12. The second sealing O-ring 26 is seated in the second O-ring seat 48 and also engages the inner surface 69 of the supply coupling 12 and the O-ring seat 60.

As the elongate manifold 16 is screwed into the nozzle coupling 14, the gasket 28 is compressed sealingly engaging the nozzle coupling 14 and the elongate manifold 16. The insertion and tightening of the elongate manifold 16 in the nozzle coupling bore 68 is limited by engagement of the flange 52 with the upward interface surface 60 or with the gasket 28. Once tightened, the nozzle coupling 14, along with the elongate manifold 16, is adjustably rotatable relative to the supply coupling 12 about axis A1. The axis A1 thus is a swivel axis for nozzle swivel joint 10.

FIG. 2 illustrates the flat downward interface surface 62 of the supply coupling 12 confronting the flat upward interface surface 66 of the nozzle coupling 14 and compressing the frictional O-ring 30 in the circular groove 69. In the preferred embodiment a gap separates the two interface surfaces 62, 66. The rotational resistance of the nozzle swivel joint 10 is principally provided by the friction between the elongate manifold head 18 and the body of the supply coupling 12 and the friction provided by the frictional O-ring 30.

As best shown in FIG. 2, an annular space 80 is located between the inside surface 59 of the bore, the midsection 34 of the manifold 16, and the interface surfaces 62, 66. This annular space 80 may be filled with grease or other suitable lubricative material to reduce the rotational resistance of the joint 10. The first sealing O-ring 24 isolates any such lubricative materials from liquid in the nozzle swivel joint 10.

The configuration of the nozzle swivel joint 10 allows for easy assembly. Additionally, in that the elongate manifold 16 does not rotate with respect to the nozzle coupling 14, wear and stress on the gasket 28 is minimized. Further, the compression of the sealing O-rings 24, 26 is dictated by the positioning of the valve seats 46, 48, 60 and is substantially independent of the extent of the tightening of the elongate manifold 16 in the nozzle coupling 14. Additionally, the rotational resistance of the nozzle coupling 14 with the elongate manifold 16 is substantially independent of the extent of the tightening of the elongate manifold 16. Thus, any critical tightening tolerance of the elongate manifold 16 into the nozzle coupling 14 during assembly is minimized.

The liquid flow through the swivel joint 10 is as follows: The liquid from a supply source (not shown) enters the nozzle swivel joint 10 through the inlet opening 58, passes through the axial flow passage 57 and into the inlet chamber 82 which is defined by the inner surface 59 of the bore 56 and the circumferential groove 38 on the manifold 16, the liquid then travels into the inlet port 40 in the manifold 16, down the passageway and out the outlet port 42, into the interior chamber 70, out the axial flow passage 76 and out the outlet opening 78 to the spray nozzle (not shown).

The structural elements may be machined or otherwise formed out of various rigid materials such as steel, stainless steel, or aluminum. It is also anticipated other materials such as plastics may be suitable in certain applications.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A swivel joint for conveying pressurized liquids, the joint comprised of:
   a) a first coupling with an interface surface, a bore opening in the interface surface, a bore extending from the bore opening through the coupling, a flow passage extending from the bore to an opening;
   b) a second coupling having an interface surface, a bore opening in the interface surface, an interior chamber, a bore extending from the bore opening to the interior chamber, a circular groove surrounding the bore opening in the interface surface and a flow passage extending from the bore to an opening;
   c) a frictional O-ring positioned in the circular groove;
   d) an elongate manifold sealingly inserted through the bore of the first coupling and removably and sealingly connected into the bore of the second coupling, the interface surface of the first coupling confronting the interface surface of the second coupling and engaging the frictional O-ring engaged between the interface surfaces, whereby the first coupling is resistably rotatable with respect to the second coupling, an annular space being formed between the respective interface surfaces and the O-ring and the elongate manifold, the elongate manifold having a connecting passageway, the passageway positioned to connect the flow passage of the first coupling to the flow passage of the second coupling; and
   e) a non-liquid lubricant in said annular space.

2. The swivel joint of claim 1, wherein the flow passage in the first coupling is perpendicular to the bore in the first coupling; and wherein the flow passage in the second coupling is perpendicular to the bore in the second coupling.

3. The swivel joint of claim 2, wherein the interface surface of the first coupling is flat and is perpendicular to the bore in the first coupling and the interface surface of the second coupling is flat and is perpendicular to the bore in the second coupling.

4. The swivel joint of claim 3, wherein the elongate manifold is comprised of a head, a midsection and a cylindrical threaded end, and wherein the bore in the second coupling has a threaded portion, and the threaded end is engageable in the threaded portion for removably connecting the manifold to the second coupling.

5. The swivel joint of claim 4, wherein the midsection is substantially cylindrical and has a circumferential groove positioned at the flow passage in the first coupling and wherein the connecting passageway has a port at the circumferential groove.

6. The swivel joint of claim 5, further comprising a first sealing O-ring and a second sealing O-ring, the elongate manifold having a first O-ring seat above the circumferential groove and a second O-ring seat below the circumferential groove, the first and second O-rings positioned in the first and second O-ring seats respectively and engaged with the inside surface of the bore of the supply coupling.

7. The swivel joint of claim 6, further comprising a gasket and wherein the second coupling has a gasket seat at the bore opening, wherein the elongate manifold is further comprised of a collar intermediate the threaded end and the midsection, the gasket sealingly engaged between the collar and the gasket seat.

8. The swivel joint of claim 7, wherein the first coupling further comprises a first threaded connector for connecting the opening in the first coupling to a liquid supply and the second coupling further comprises a second threaded connector for attaching the opening in the second coupling to a spray nozzle.

9. The swivel joint of claim 6, wherein the threaded end is cylindrical with an axis and the connecting passageway constitutes a bore along said axis.

10. The swivel joint of claim 9, wherein the first coupling is resistably rotatable with respect to the second coupling through an angle of at least 180°.

11. A nozzle swivel joint for conveying pressurized liquids to a spray nozzle, the joint comprised of:
a) a supply coupling with an inlet opening, a bore opening, a bore extending from the bore opening through the coupling, a flow passage extending perpendicularly from the bore to the inlet opening, and a downward flat interface surface surrounding the bore opening;
b) a nozzle coupling having an interior chamber, an outlet opening, a flow passage connecting the outlet opening to the interior chamber, a bore opening, a bore perpendicular to the flow passage extending from the bore opening to the interior chamber, a flat upward interface surface surrounding the bore opening, and the upward flat interface surface having a circular groove concentric with the bore opening such that the upward flat interface surface encompasses the groove on both its inner and outer periphery;
c) a frictional O-ring positioned in the circular groove; and
d) an elongate manifold sealably inserted through the bore of the supply coupling and removably and sealably connected into the bore of the nozzle coupling, the downward flat interface surface confronting the upward interface surface and compressing the frictional O-ring, whereby the supply coupling is resistably rotatable with respect to the nozzle coupling, the elongate manifold having an inlet port, an outlet port, and a connecting passageway, the inlet port aligned with the supply coupling flow passage, the outlet port positioned at the interior chamber of the nozzle coupling whereby the flow passage of the supply coupling communicates through the manifold to the flow passage of the nozzle coupling.

12. The nozzle swivel joint of claim 11, wherein the elongate manifold is comprised of a head, a midsection and a cylindrical threaded end, wherein the bore in the nozzle coupling has a threaded portion removably connectable to the threaded end for connecting the manifold to the nozzle coupling.

13. The nozzle swivel joint of claim 12, wherein the midsection is substantially cylindrical and has a circumferential groove positioned at the inlet port.

14. The nozzle swivel joint of claim 13, further comprising a first sealing O-ring and a second sealing O-ring, the elongate manifold having a first O-ring seat above the circumferential groove and a second O-ring seat below the circumferential groove, the first and second O-rings positioned in the first and second O-ring seats respectively.

15. The nozzle swivel joint of claim 14, further comprising a gasket and wherein the nozzle coupling has a gasket seat at the bore opening, wherein the elongate manifold is further comprised of a collar intermediate the threaded end and the midsection, the gasket sealingly engaging the collar and the gasket seat.

16. The nozzle swivel joint of claim 15, wherein the supply coupling further comprises a first threaded connector for connecting the inlet opening to a fluid source and the nozzle coupling further comprises a second threaded connector for attaching the outlet opening to a spray nozzle.

17. The nozzle swivel joint of claim 16, further comprising a non-liquid lubricant and wherein the supply coupling, the nozzle coupling, and the elongate manifold define an annular space, and the annular space contains said lubricant.

18. A nozzle swivel joint for conveying pressurized liquids to a spray nozzle, the joint comprised of:
a) a supply coupling comprised of a threaded connector for connecting to a pressurized liquid supply and having an inlet opening, a bore opening, a bore extending from the bore opening through the coupling, the bore having an inside surface, a flow passage extending perpendicularly from the bore to the inlet opening, a downward flat interface surface surrounding and perpendicular to the bore opening;
b) a nozzle coupling comprised of a threaded connector for connecting the nozzle coupling to a nozzle and having an interior chamber, an outlet opening, a flow passage connecting the outlet opening to the interior chamber, a bore opening, a gasket seat at the bore opening, a bore perpendicular to the flow passage extending from the bore opening to the interior chamber, the bore having a threaded portion a flat upward interface surface surrounding and perpendicular to the bore opening, the upward flat interface surface having a circular groove concentric with the bore opening;

c) a frictional O-ring positioned in the circular groove;
d) a first sealing O-ring and a second sealing O-ring;
e) a gasket; and
f) an elongate manifold comprised of a head, a substantially cylindrical midsection, a collar, and a cylindrical threaded end, the elongate manifold extending through the bore of the supply coupling and connected into the threaded portion of the bore of the nozzle coupling, the midsection having a circumferential groove aligned with the supply coupling flow passage, the first O-ring positioned above the circumferential groove sealing engaging the midsection of the elongate manifold and the inside surface of the bore in the supply coupling, the second O-ring positioned below the circumferential groove sealingly engaging the midsection of the elongate manifold and the inside surface of the bore in the supply coupling, the downward flat interface surface confronting the upward flat interface surface and compressing the frictional O-ring, and the gasket sealingly seated between the gasket seat and the collar, the elongate manifold having an inlet port, an outlet port, and a connecting passageway, the inlet port positioned at the circumferential groove, the outlet port positioned at the interior chamber of the nozzle coupling whereby the flow passage of the supply coupling communicates through the manifold to the flow passage of the nozzle coupling and whereby the supply coupling is resistably rotatable with respect to the nozzle coupling.

19. A swivel joint for conveying pressurized liquids, the joint comprised of:

a) a first coupling having a flat interface surface, a bore opening in the interface surface and the bore extending through the coupling perpendicular to the interface surface, and a flow passage perpendicular to the bore and extending from the bore to a passage opening;
b) a second coupling having a flat interface surface, a bore opening forming a gasket seat in the interface surface and a circular groove in the interface surface about the bore opening, and the bore extending perpendicular to the interface surface at least partially through the second coupling to form an interior chamber, the bore having a threaded portion, and a flow passage perpendicular to the bore and extending from the bore to a passage opening;
c) a frictional O-ring positioned in the circular groove;
d) an elongate manifold comprising a head, a midsection, and a threaded end; wherein the threaded end is engageable with the threaded portion of said bore for removably connecting the manifold to the second coupling; and wherein the midsection is substantially cylindrical and has a connecting passageway positioned to connect the flow passage of the first coupling to the flow passage of the second coupling, the midsection having a tapered shoulder adjacent the threaded end;
e) a gasket seated in the gasket seat and engageable by said tapered shoulder, whereby an annular space is created between said gasket and said frictional O-ring and bounded by the first coupling interface surface, the second coupling interface surface and the midsection of said manifold; and
f) a non-liquid lubricant in said annular space.

* * * * *